(12) United States Patent
Haruta et al.

(10) Patent No.: US 12,059,831 B2
(45) Date of Patent: Aug. 13, 2024

(54) BIAXIALLY ORIENTED POLYESTER FILM ROLL

(71) Applicant: TOYOBO CO., LTD., Osaka (JP)

(72) Inventors: Masayuki Haruta, Inuyama (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 360 days.

(21) Appl. No.: 17/431,308

(22) PCT Filed: Feb. 5, 2020

(86) PCT No.: PCT/JP2020/004323
§ 371 (c)(1),
(2) Date: Aug. 16, 2021

(87) PCT Pub. No.: WO2020/170819
PCT Pub. Date: Aug. 27, 2020

(65) Prior Publication Data
US 2022/0126495 A1   Apr. 28, 2022

(30) Foreign Application Priority Data
Feb. 18, 2019 (JP) .................. 2019-026449

(51) Int. Cl.
*B29C 48/00* (2019.01)
*B29C 48/08* (2019.01)
(Continued)

(52) U.S. Cl.
CPC .......... *B29C 48/0018* (2019.02); *B29C 48/08* (2019.02); *B29C 48/307* (2019.02);
(Continued)

(58) Field of Classification Search
CPC ... B29C 48/0018; B29C 48/08; B29C 55/143; B29C 48/307; B29C 48/92
(Continued)

(56) References Cited

U.S. PATENT DOCUMENTS 7,208,565 B1    4/2007  Nakajima et al.
2002/0158369 A1* 10/2002 Takagi ................... B29C 48/08
                                              264/290.2
(Continued)

FOREIGN PATENT DOCUMENTS

JP    S63-252853 A   10/1988
JP    2001-151907 A   6/2001
(Continued)

OTHER PUBLICATIONS

Machine_English_translation_JP_2008248135_A; Suzuki, Takashi; Polyester Film for Masking Tape or Photomask; Oct. 16, 2008; EPO; whole document (Year: 2023).*
(Continued)

*Primary Examiner* — Tahseen Khan
(74) *Attorney, Agent, or Firm* — Leydig, Voit & Mayer, Ltd.

(57) ABSTRACT

To provide a biaxially-oriented polyester film roll that is excellent in transparency and heat resistance and has less defects. A biaxially oriented polyester film roll of the present invention characterized by satisfying requirements (1) a winding length of the film roll, (2) a width of the film roll, (3) an average hardness of an outermost surface layer of the polyester film roll, (4) a variation in hardness, (5) a thickness of a polyester film of the polyester film roll, and (6) an irregularity of thickness in the maximum concave portion.

12 Claims, 3 Drawing Sheets

CALCULATION EXAMPLE

Irregularity of thickness in maximum concave portion = (Maximum height thickness in maximum concave portion − Minimum height thickness in maximum concave portion) ÷ Average thickness × 100

(51) Int. Cl.
  *B29C 48/305* (2019.01)
  *B29C 48/92* (2019.01)
  *B29C 55/14* (2006.01)
  *B29K 67/00* (2006.01)

(52) U.S. Cl.
  CPC ............ *B29C 48/92* (2019.02); *B29C 55/143* (2013.01); *B29C 2948/92704* (2019.02); *B29K 2067/003* (2013.01)

(58) Field of Classification Search
  USPC .......................................................... 428/98
  See application file for complete search history.

(56) References Cited

U.S. PATENT DOCUMENTS

| | | | |
|---|---|---|---|
| 2004/0058805 | A1 | 3/2004 | Nakajima et al. |
| 2007/0149757 | A1 | 6/2007 | Nakajima et al. |
| 2011/0177289 | A1* | 7/2011 | Takegami ............ C08G 63/189 528/298 |
| 2013/0012665 | A1* | 1/2013 | Nozawa ................ C08G 63/85 525/437 |
| 2016/0130415 | A1 | 5/2016 | Miyasaka |

FOREIGN PATENT DOCUMENTS

| | | | |
|---|---|---|---|
| JP | 3461175 | B2 | 10/2003 |
| JP | 3506236 | B2 | 3/2004 |
| JP | 2008-248135 | A | 10/2008 |
| JP | 2008248135 | A * | 10/2008 |
| JP | 2014-073598 | A | 4/2014 |
| JP | 2015-021119 | A | 2/2015 |

OTHER PUBLICATIONS

China National Intellectual Property Administration, Office Action in Chinese Patent Application No. 202080015038.X (Aug. 24, 2022).

Intellectual Property India, Examination Report in Indian Patent Application No. 202147039725 (Dec. 26, 2022).

Japanese Patent Office, International Search Report in International Patent Application No. PCT/JP2020/004323 (Apr. 28, 2020).

European Patent Office, Extended European Search Report in European Patent Application No. 20758785.8 (Jul. 25, 2022).

* cited by examiner

[Fig. 1]

CALCULATION EXAMPLE

Irregularity of thickness in maximum concave portion = (Maximum height thickness in maximum concave portion − Minimum height thickness in maximum concave portion) ÷ Average thickness × 100

Fig. 3

TRANSVERSE STRETCHING MACHINE CROSS-SECTIONAL VIEW OF COOLING PROCESS

* The arrow indicates the direction of the wind. The wind that blows toward the film is cooling air. The wind that blows in the opposite direction to the film is exhaust (suction of oligomers).

BIAXIALLY ORIENTED POLYESTER FILM ROLL

TECHNICAL FIELD

The present invention relates to a biaxially oriented polyester film having excellent hygiene, and more specifically, a biaxially oriented polyester film roll suitably used for labels or bags for food packings because the film roll provides no wrinkle even after long-term storage after film production and no defect during processing step such as printing, and packing.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packaging materials, and automobiles. Among plastic films, biaxially oriented PET films have been used widely for industrial and packaging fields because of their excellent balance between cost and mechanical characteristic strength, heat resistance, dimensional stability, chemical resistance, optical characteristics, etc.

In the field of industrial films, biaxially oriented PET films can be used as functional films for flat panel displays (FPD) such as liquid crystal displays and plasma displays because of their excellent transparency. Furthermore, PET films to which hydrolysis resistance is imparted have been used as films for solar cell back sheets and also used for various purposes as functional films and base films.

In the field of packaging films, biaxially oriented PET films have been used for applications such as foodstuff packaging and gas barrier films. Especially, films excellent in gas barrier properties have been used as packaging materials required to have air-tightness for foodstuff, pharmaceutical products, electronic parts, and so on, or as gas shielding materials, and there has been a growing demand for such films in recent years. A vapor deposition has been widely employed using film roll to provide gas barrier property.

In recent years, in order to improve productivity, the processing step of a vapor-deposited polyester film has been speeded up, and the film roll as a base material has been widened and lengthened. Wider and longer rolls increases possibility of deteriorating film traveling property and providing winding wrinkles, winding deviations, and spoking wrinkles. As a result, the film has spots or non-deposition areas in the part of the evaporated thin film which deteriorate gas barrier property and the film has poor appearance by wrinkles formed during winding of the film after the vapor deposition. These defects hamper the film to be used as products.

Also, most of packaging bags are disposed after its use and therefore, thinner film for packaging bags is requested to reduce waste. However, thinner film generates buckling of film that exposes film roll appearance defects during storage after slitting film which results in trouble when printing or processing the film roll. In particular, film has poor flatness at slack part and slack in width direction of film roll results in print omission and the like, which causes film loss.

The present inventors newly found that packaging films hardly accepts film roll containing film slack of previously permissible imperfection level because thinner films, higher speed printing, and multicolor printing expose inferiorities generated by changes in appearance during storage and slack.

As solutions for these problems, Patent Document 1 proposes a method for film roll winding by controlling the surface pressure from a pressurizing contact roll to increase surface pressure of surface part of roll relative to surface pressure of winding core part. However, Patent Document 1 describes winding hardness, winding surface pressure and winding tension and the like to prevent wrinkles in surface layer and in winding core but does not describes changes in appearance of film roll during long term storage.

Since a packaging film comes into direct contact with foodstuff, the polyester film desirably contains few foreign substances from the viewpoint of hygiene. In addition, since an antimony catalyst used in the process of producing (polymerizing) a polyester raw material may be carcinogenic, the polyester film desirably contains as little antimony as possible or no antimony.

Conventionally, as described in Patent Documents 2 and 3, for example, there are polyester raw materials produced without using an antimony catalyst. However, Patent Documents 2 and 3 do not describe a method of reducing the number of foreign substances in the film, and desired film properties.

PRIOR ART DOCUMENT

Patent Documents

Patent Document 1: Japanese Patent No. S63-252853A
Patent Document 2: Japanese Patent No. 3461175
Patent Document 3: Japanese Patent No. 3506236
Patent Document 4: Japanese Patent No. 2001-151907A

SUMMARY OF THE INVENTION

Problems to be Solved by the Invention

An object of the present invention is to provide a biaxially-oriented polyester film roll that has an extremely low content of antimony; contains few foreign substances; is excellent in transparency and heat resistance; and is not only less prone to the occurrence of sagging in the film roll immediately after film production, but also less prone to the occurrence of sagging in the film roll due to the lapse of time even when stored for a long time and less prone to cause defects during printing processing.

Means for Solving the Problems

The present inventors made intensive studies, and as a result, have found that, in a slitting process in which a polyester film without using antimony with desired surface roughness is slit in an arbitrary width from a master roll to form a product roll, the control of a winding tension after slitting and a contact pressure of a contact roll allows the hardness of the roll to be within the above range, and such a film roll is less prone to the occurrence of sagging after long-term storage. The present invention has been completed based on this finding.

The present invention has the following configurations.

1. A biaxially oriented polyester film roll formed by winding the biaxially oriented polyester film around a film roll, the biaxially oriented polyester film roll comprising:

an antimony content in the biaxially oriented polyester film is 10 ppm or less;
a phosphorus content in the biaxially oriented polyester film is 25 ppm or more and 75 ppm or less;
an arithmetic mean roughness of the surface of the biaxially oriented polyester film is 0.02 µm or more and 0.05 µm or less; and
the biaxially oriented polyester film roll satisfying the following requirements (1) to (6):
(1) a winding length of the film roll is 8000 m or more and 80000 m or less;
(2) a width of the film roll is 500 mm or more and 4000 mm or less;
(3) an average hardness is in the range of 500 or more and 700 or less when a hardness of an outermost surface layer of the polyester film roll is measured at an interval of 50 mm along the film width direction;
(4) a variation in hardness is 10% or more and 20% or less when a hardness of an outermost surface layer of the polyester film roll is measured at an interval of 50 mm along the film width direction;
(5) a thickness of a polyester film of the polyester film roll is 5 µm or more and 40 µm or less;
(6) an irregularity of thickness in the maximum concave portion, which is obtained from the maximum thickness difference in the maximum concave portion and an average film thickness, is 10% or less at a position where a thickness pattern makes a concave portion in an irregularity of thickness in the width direction on a surface layer of the film roll and at a concave portion that has a maximum thickness difference (maximum concave portion);
2. The biaxially oriented polyester film roll according to above 1, wherein an irregularities of thicknesses of all of samples, which are obtained from their maximum thickness differences in their maximum concave portions and the film average thicknesses, are 10% or less in the irregularities of thicknesses in the film width direction of samples, which are obtained by sampling from the surface layer of the film roll of the biaxially-oriented polyester film at an interval of 1000 m along a winding length.
3. The biaxially oriented polyester film roll according to above 1 or 2, wherein
an absolute value of a difference between refractive indices in the width direction at the maximum thickness position of either of the both ends of the concave portion and at the minimum thickness position of the concave portion is 0.010 or less in the maximum concave portion in the thickness pattern along the width direction of the polyester film roll.
4. The biaxially oriented polyester film roll according to any one of above 1 to 3, wherein
a number of defects with a size of 1 mm or more is 1.0 or less per 10000 square meters of the film.
5. The biaxially oriented polyester film roll according to any one of claims 1 to 4, wherein
both of a static friction coefficient and a dynamic friction coefficient between the film surfaces of the winding outside and the winding inside of the biaxially-oriented polyester film are 0.1 or more and 0.8 or less.
6. The biaxially oriented polyester film roll according to any one of above 1 to 5, wherein
an intrinsic viscosity of the film is 0.51 dl/g or more and 0.70 dl/g or less.

7. A method for producing the biaxially-oriented polyester film roll according to any one of above 1 to 6, wherein
a raw material polyester resin is melt-extruded such that a difference between an intrinsic viscosity of the raw material polyester resin and an intrinsic viscosity of the polyester film is 0.06 dl/g or less, and then cooled and solidified to obtain an unstretched film, and subsequently, the unstretched film is subjected to a biaxial stretching and then to a heat setting treatment, and subsequently winding the biaxially-oriented film as a master roll, and then slitting the master roll and then winding into a roll.

Effect of the Invention

According to the present invention, there can be provided a biaxially-oriented polyester film roll that has an extremely low content of antimony, that contains few foreign substances, and that is excellent in transparency and heat resistance as well as that has hardly forms slack of the film roll immediately after film production, hardly forms slack of the film roll with lapse of time during long term storage, and hardly generates defects during printing processing.

DESCRIPTION OF EMBODIMENTS

The following is a description of embodiments of the present invention. The present invention is not to be construed as limited to the following embodiments, including examples, and various changes may be made within the scope of achieving the purpose of the invention and not deviating from the gist of the invention.
(Raw Material Polyester Resin)
The biaxially-oriented polyester film of the present invention contains a polyethylene terephthalate-based resin as a constituent component. Here, the polyethylene terephthalate-based resin contains an ethylene glycol-derived component and a terephthalic acid-derived component as main constituent components. The "main constituent components" mean that terephthalic acid is contained in an amount of 80 mol % or more based on 100 mol % of all dicarboxylic acids constituting polyester, and ethylene glycol is contained in an amount of 80 mol % or more based on 100 mol % of all glycol components.
As far as the object of the present invention is not hindered, a different dicarboxylic acid component and a different glycol component may be copolymerized with the main constituent components. The copolymerization amount proportions of the different dicarboxylic acid component and the different glycol component are each less than 20 mol %, preferably 10 mol % or less, and particularly preferably 5 mol % or less based on the total amount of dicarboxylic acid components or the total amount of glycol components.
Examples of the different dicarboxylic acid components include aromatic dicarboxylic acids such as isophthalic acid, phthalic acid, naphthalene dicarboxylic acid, 4,4'-dicarboxybiphenyl, and sodium 5-sulfoisophthalate; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahydrophthalic acid; and aliphatic dicarboxylic acids such as oxalic acid, malonic acid, succinic acid, adipic acid, azelaic acid, sebacic acid, undecanedioic acid, dodecanedioic acid, octadecanedioic acid, fumaric acid, maleic acid, itaconic acid, mesaconic acid, citraconic acid, and dimer acid; and the like.

Examples of the different glycol components include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricyclodecane, diethylene glycol, and triethylene glycol; ethylene oxide adducts or propylene oxide adducts of bisphenol A, bisphenol S, bisphenol C, bisphenol Z, bisphenol AP, and 4,4'-biphenyl; alicyclic glycols such as 1,2-cyclohexanedimethanol, 1,3-cyclohexanedimethanol, and 1,4-cyclohexanedimethanol; polyethylene glycol; polypropylene glycol; and the like.

As a polymerization method of such a polyethylene terephthalate-based resin, there can be employed any production method such as a direct polymerization method in which terephthalic acid, ethylene glycol, and, if necessary, the different dicarboxylic acid component and the different glycol component are allowed to react directly; and a transesterification method in which a dimethyl ester of terephthalic acid (and, if necessary, a methyl ester of the different dicarboxylic acid) and ethylene glycol (and, if necessary, the different glycol component) are subjected to a transesterification reaction, followed by polycondensation reaction.

As the polyester resin, recycled resin obtained through recycling PET bottles or polyester resin containing a monomer component derived from biomass can also be used.

The biaxially-oriented polyester film of the present invention may contain, as a constituent component, other resins such as polyamide, polystyrene, polyolefin, and polyester other than those described above. From the viewpoints of mechanical properties and heat resistance of the biaxially-oriented polyester film, the content of the other resins is preferably 30% by mass or less, more preferably 20% by mass or less, even more preferably 10% by mass or less, particularly preferably 5 mol % or less, and most preferably 0 mol % (the total resin components constituting the polyester film are substantially a polyethylene terephthalate-based resin), relative to the total amount of all resin components of the polyester film.

The intrinsic viscosity of the polyethylene terephthalate-based resin is preferably in the range of 0.57 to 0.76 dl/g, more preferably 0.60 to 0.73 dl/g, and further preferably 0.63 to 0.70 dl/g. The intrinsic viscosity of less than 0.57 dl/g makes an obtained polyester film likely to tear during the production (so-called breakage occurs). The intrinsic viscosity of more than 0.76 dl/g increases the filtration pressure and makes high precision filtration difficult to be performed, causing difficulty in performing resin extrusion through a filter.

Furthermore, the intrinsic viscosity of resin in the polyester film is preferably in the range of 0.51 to 0.70 dl/g, more preferably 0.56 to 0.68 dl/g, and further preferably 0.59 to 0.65 dl/g. The intrinsic viscosity of less than 0.51 dl/g makes an obtained polyester film likely to tear in a processing step such as printing. The intrinsic viscosity of more than 0.76 dl/g makes the effect of improving the mechanical properties likely to be saturated.

(Polymerization Catalyst)

Next, a polymerization catalyst used in producing the raw material polyester resin used in the present invention will be described. The polymerization catalyst used in the present invention is a polymerization catalyst which is characterized by having an ability of promoting esterification. In the present invention, as described later, it is preferable not to use a polymerization catalyst of an antimony compound such as antimony trioxide, which has been conventionally used, if possible. As the polymerization catalyst which is characterized by having an ability of promoting esterification, a polymerization catalyst containing at least one selected from aluminum compounds and at least one selected from phosphorus compounds is preferably used.

As the aluminum compound constituting the polymerization catalyst used for a synthesis of the raw material polyester resin used in the present invention, any known aluminum compounds can be used without limitation.

Specific examples of the aluminum compounds include aluminum acetate, basic aluminum acetate, aluminum lactate, aluminum chloride, aluminum hydroxide, aluminum hydroxychloride, an organic aluminum compound such as aluminum acetylacetonate and aluminum oxalate, and partial hydrolysates thereof. Among them, a carboxylate, an inorganic acid salt, and a chelate compound are preferred. Among them, aluminum acetate, basic aluminum acetate, aluminum lactate, aluminum chloride, aluminum hydroxide, aluminum hydroxychloride, and aluminum acetylacetonate are more preferred; aluminum acetate, basic aluminum acetate, aluminum chloride, aluminum hydroxide, and aluminum hydroxychloride are further preferred; and aluminum acetate and basic aluminum acetate are most preferred.

The amount of the aluminum compound used in the polymerization catalyst in the present invention is set so that preferably 1 to 80 ppm, more preferably 2 to 60 ppm, further preferably 3 to 50 ppm, especially preferably 5 to 40 ppm, and most preferably 10 to 30 ppm of aluminum atoms remains relative to the total mass of the resulting polyester resin.

When the amount of the aluminum compound is less than the above range, there is a possibility of resulting in poor catalytic activity, and when the amount of the aluminum compound is more than the above range, there is a possibility of inducing generation of aluminum-based foreign substances.

Almost 100% of the used amount of the aluminum compound remains even under a reduced pressure environment at the time of polyester polymerization. Accordingly, the used amount may be considered to be equal to a residual amount.

Although there is no particular limitation on the phosphorus compound to be used as the polymerization catalyst, it is preferable to use a phosphonic acid-type compound or a phosphinic acid-type compound because the effect of improving the catalytic activity is great. It is particularly preferable to use a phosphonic acid-type compound because the effect of improving the catalytic activity is especially great.

Among the phosphorus compounds, phosphorus compounds having a phenol moiety in the same molecule are preferred. While any phosphorus compounds having a phenol structure can be used without any limitation, it is preferable to use one or two or more compounds selected from the group consisting of phosphonic acid-based compounds and phosphinic acid-based compounds having a phenol moiety in the same molecule because the effect of improving the catalytic activity is great. Among these, it is preferable to use one or two or more phosphonic acid-based compounds having a phenol moiety in the same molecule because the effect of improving the catalytic activity is especially great.

As examples of phosphorus compounds having a phenol moiety in the same molecule, compounds represented by the following general formulas (1) and (2) can be given.

Formula (1)

Formula (2)

In the formulas (1) and (2), $R^1$ represents a hydrocarbon group having 1 to 50 carbon atoms including a phenol moiety, or a hydrocarbon group having 1 to 50 carbon atoms including a substituent such as a hydroxyl group, a halogen group, an alkoxyl group or an amino group, and a phenol moiety. $R^4$ represents hydrogen, a hydrocarbon group having 1 to 50 carbon atoms, or a hydrocarbon group having 1 to 50 carbon atoms including a substituent such as a hydroxyl group, a halogen group, an alkoxyl group or an amino group. $R^2$ and $R^3$ each independently represent hydrogen, a hydrocarbon group having 1 to 50 carbon atoms, or a hydrocarbon group having 1 to 50 carbon atoms including a substituent such as a hydroxyl group or an alkoxyl group. However, the hydrocarbon group may contain a branched structure, an alicyclic structure such as cyclohexyl, or an aromatic ring structure such as phenyl or naphthyl. Terminals of $R^2$ and $R^4$ may bind to each other.

Examples of the phosphorus compound having a phenol moiety in the same molecule include p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenyl phosphinic acid, methyl p-hydroxyphenylphenylphosphinate, phenyl p-hydroxyphenylphenylphosphinate, p-hydroxyphenylphosphinic acid, methyl p-hydroxyphenylphosphinate, and phenyl p-hydroxyphenylphosphinate. Besides these, a phosphorus compound represented by the following general formula (3) can be mentioned.

Formula (3)

In the formula (3), $X_1$ and $X_2$ each represent hydrogen, an alkyl group having 1 to 4 carbon atoms, or mono- or more-valent metal.

$X_1$ may be bi- or more-valent metal, and $X_2$ may not exist. Further, an anion corresponding to an excessive valence of metal with respect to the phosphorus compound may be arranged.

As the metal, Li, Na, K, Ca, Mg, and Al are preferred.

By adding such a phosphorus compound having a phenol moiety in the same molecule at the time of polyester polymerization, the catalytic activity of the aluminum compound improves, and the thermal stability of the polymerized copolymerized polyester resin also improves.

Among the aforementioned phosphorus compounds, at least one phosphorus compound selected from the compounds represented by the formulas (4) and (5) is preferably used as a polycondensation catalyst.

Formula (4)

Formula (5)

As a compound represented by the formula (4), Irganox 1222 (manufactured by BASF) is commercially available. As a compound represented by the formula (5), Irganox 1425 (manufactured by BASF) is commercially available and usable.

The amount of the phosphorus compound used in the polymerization catalyst in the present invention is set so that preferably 10 to 100 ppm, more preferably 15 to 90 ppm, further preferably 20 to 80 ppm, particularly preferably 25 to 70 ppm, and most preferably 30 to 60 ppm of phosphorus atoms remains relative to the total mass of the resulting raw material polyester resin.

When phosphorus atoms remain in an amount exceeding the above upper limit or below the above lower limit, the polymerization activity may be deteriorated.

When the phosphorus compound is put under a reduced pressure environment at the time of polyester polymerization, about 10 to 30% of the used amount is removed to an outside of the system depending on the conditions. In light of this, it is necessary to conduct a trial experiment several times to find the remaining percentage of the phosphorus compound in polyester, and then to determine the amount to be used.

Also, by using the above phosphorus compound, it is possible to improve the heat resistance of the resin. Although the reason is unclear, it is considered that the heat resistance of the polyester resin is improved by the hindered phenol moiety in the phosphorus compound.

If the remaining amount of the phosphorus compound is less than 10 ppm, the effect of improving the heat resistance is weakened, and as a result, the effect of improving the heat resistance and the coloring of the polyester resin of the present invention may be lost.

In order to further improve the catalytic activity as long as the effect of the present invention is not impaired, a metal-containing polycondensation catalyst such as an antimony compound, a titanium compound, a tin compound, or a germanium compound may be used together. In that case, the amount of the antimony compound is preferably 10 ppm or less in terms of an antimony atom relative to the mass of the obtained copolymerized polyester resin. The amount of the germanium compound is preferably 10 ppm or less in terms of a germanium atom relative to the mass of the obtained copolymerized polyester resin. The amount of the titanium compound is preferably 3 ppm or less in terms of a titanium atom relative to the mass of the obtained copolymerized polyester resin. The amount of the tin compound is preferably 3 ppm or less in terms of a tin atom relative to the mass of the obtained polyester resin. Considering the object of the present invention, it is preferable not to use these metal-containing polycondensation catalysts such as an antimony compound, a titanium compound, a tin compound, and a germanium compound, if possible.

In the present invention, in addition to the aluminum compound, a small amount of at least one selected from the group of alkali metal, alkaline earth metal, and a compound thereof may coexist as a second metal-containing component. The coexistence of the second metal-containing component in the catalyst system is effective for improving the catalytic activity as well as suppressing generation of diethylene glycol, and thus effective for giving a catalyst component with improved reaction speed and improving the productivity. When alkali metal, alkaline earth metal, or a compound thereof is used in combination, the used amount (mol %) thereof is preferably $1 \times 10^{-5}$ to 0.01 mol % relative to the molar number of the dicarboxylic acid component constituting the polyester resin. Almost 100% of the used amount of alkali metal, alkaline earth metal or a compound thereof remains even under a reduced pressure environment at the time of polyester polymerization. Accordingly, the used amount may be considered to be equal to a residual amount.

The polymerization catalyst according to the present invention has catalytic activities not only in the polycondensation reaction, but also in esterification reaction and transesterification reaction. Transesterification reaction between an alkyl ester of a dicarboxylic acid, such as dimethyl terephthalate, and a glycol such as ethylene glycol is generally conducted in the presence of a transesterification catalyst such as zinc, but in place of this catalyst, the catalyst of the present invention can be used. The polymerization catalyst according to the present invention has catalytic activities not only in melt polymerization but also in solid phase polymerization and solution polymerization.

The polymerization catalyst of polyester used in the present invention can be added to the reaction system in any stage of polymerization. For example, the polymerization catalyst can be added to the reaction system in any stage before starting and during esterification or transesterification reaction, or in any stage just before starting of polycondensation reaction or during polycondensation reaction. In particular, it is preferred to add the aluminum compound and the phosphorus compound according to the present invention just before starting of polycondensation reaction.

(Preferred Production Method of Biaxially-Oriented Polyester Film)

The biaxially-oriented polyester film of the present invention may have a single-layer structure or a laminated structure of two layers, three layers, or four or more layers. In the case of a laminated structure of two or more layers, each layer contains, as described above, polyethylene terephthalate-based resin, inorganic particles, and a resin other than polyethylene terephthalate-based resin, as constituent components. It is preferable that the types or contents of any of the constituent components of the layers adjacent to each other be different.

In the case of a single-layer structure composed of a layer A, the layer A in the present invention constitutes the entire biaxially-oriented polyester film.

In the case of a two-layer structure including the layer A, the layer A in the present invention is either one or both of two layers. In the case of a three-layer structure including the layer A, the layer A in the present invention is any one of three layers, or two surface layers on both sides.

In particular, in the case of the three-layer structure, the surface roughness of the film can be controlled by controlling the amount of addition of particles only in the surface layer part even if the inner layer contains no inorganic particles, and the content of inorganic particles in the film can be reduced. Since smell components escape through voids formed at the boundary between the inorganic particles and the polyester resin, such a three-layer structure leads also to the improvement of deterioration in a flavor retention property of the film.

Further, within a range which does not adversely affect the properties of the film surface, it becomes easier to mix and use a recovered material of which edges generated in a film formation process are trimmed, a recycled material in another film formation process, or the like in the inner layer at an appropriate time, which is advantageous from a cost point of view.

As the inorganic particles, for example, silica, alumina, titanium dioxide, calcium carbonate, kaolin, barium sulfate and the like can be used. The average particle size of the inorganic particles is preferably within the range of about 0.05 to 3.0 μm as measured by a Coulter counter. The lower limit of the content of the inorganic particles in the film is preferably 0.01% by weight, more preferably 0.015% by weight, and further preferably 0.02% by weigh. If the lower limit is less than 0.01% by weight, slipperiness may deteriorate. The upper limit of the content of the inorganic particles in the film is preferably 1% by weigh, more preferably 0.2% by weigh, and further preferably 0.1% by weigh. The upper limit of more than 1% by weigh is not so preferred because it may lead to deterioration in transparency.

Examples of a method for incorporating inorganic particles into polyester include a method in which inorganic particles are dispersed in ethylene glycol, which is a diol component, at a predetermined ratio in a form of slurry, and the resulting ethylene glycol slurry is added at an arbitrary stage before the completion of polyester polymerization.

In this method, when the particles are added, for example, if water sol or alcohol sol obtained during the synthesis of the particles is added without being dried once, the dispersibility of the particles becomes better, and thereby the generation of large protrusions can be suppressed.

Further, a method in which water slurry of particles is mixed directly with predetermined polyester pellets, and the mixture is supplied to a vent-type twin-screw kneading extruder to knead the mixture into polyester is also effective.

In the present invention, it is preferable to control a resin temperature of an extruder to a temperature not lower than the melting point of the resin+2° C. and not higher than the melting point of the resin+6° C. to perform extrusion. When the extrusion temperature is lower than the melting point+2° C., the resin does not melt, and the unmelted material is discharged and, unfavorably, becomes a foreign substance. When extrusion is performed at a temperature higher than the melting point+6° C., the resin is thermally deteriorated, causing the generation of a foreign substance.

The extruded sheet-shaped molten resin is extruded with a T-die and then rapidly cooled to obtain an unstretched film.

As a method for rapidly cooling the molten resin, a method in which the molten resin is cast onto a rotating drum from a T-die and rapidly cooled and solidified to obtain a substantially unoriented resin sheet may be suitably employed.

A sublimated material (oligomer or the like) of the molten resin is prone to deposit on the T-die. When the deposited material falls off, it adheres to the unstretched sheet and, unfavorably, becomes a foreign substance in the film. Therefore, it is preferable to attach a sticky sheet to the T-die in advance to avoid the sublimated material from easily falling off. Further, in order to avoid the foreign substance from transferring to the unstretched sheet even if the foreign substance adheres to a cooling roll, it is preferable to clean the cooling roll with a cleaner even during operation.

Further, the obtained unstretched film is biaxially stretched and then subjected to heat setting treatment and heat relaxation treatment. By appropriately combining the following stretching conditions in the longitudinal direction and the width direction, and the film formation conditions such as heat setting conditions and heat relaxation conditions, the preferred film properties described later can be achieved. This will be described below in detail.

The stretching method can be either simultaneous biaxial stretching or sequential biaxial stretching. The sequential biaxial stretching is preferable from the viewpoint that the film formation rate can be increased to provide high productivity. Below described is a sequential-biaxial stretching method by longitudinal stretching-transverse stretching in which a longitudinal stretching is performed first, and then a transverse stretching is performed. This order may be reversed to be transverse stretching-longitudinal stretching.

The stretch temperature in the longitudinal (machine) direction (hereinafter, may be abbreviated as MD) is preferably (Tg+5°) C. to (Tg+55°) C., and the stretch ratio in the longitudinal direction is preferably 3 to 5 times, from the point of view of reducing bowing. When the stretch temperature is higher than (Tg+55°) C., or the stretch ratio is less than 3 times, bowing is reduced, but the molecular orientation in the longitudinal direction is insufficient, which results in unfavorable deterioration of thickness unevenness in the longitudinal direction. Further, it is unfavorable because the flatness of the obtained biaxially-oriented polyester film is also deteriorated. When the stretch temperature is lower than (Tg+5°) C. or the stretch ratio is more than 5 times, the shrinkage stress increases, and bowing increases, which is unfavorable.

In the stretching in the longitudinal direction, in a method of performing stretching in multiple stages between multiple rolls instead of stretching in one stage, the film is gradually stretched in the longitudinal direction while controlling the stretching speed, so that variation in physical properties in the film width direction can be reduced. Two- to five-stage stretching is preferable from the viewpoints of effect, equipment, and cost.

In the stretching in the width (transverse) direction (hereinafter, may be abbreviated as TD), the unstretched film is introduced to a tenter capable of heating with both ends of the film held with clips, heated to a predetermined temperature with hot air, and then stretched in the width direction by increasing the distance between the clips while transporting the film in the longitudinal direction.

If the stretch temperature in the width direction is lower than Tg+5° C., breakage is, unfavorably, prone to occur during stretching of the film. If the stretch temperature is higher than Tg+70° C., uniform stretching in the width direction cannot be performed, and irregularity of thickness in the width direction becomes large, so that variation in hardness of the film roll unfavorably increases. The stretch temperature in the width direction is more preferably Tg+10° C. or higher and Tg+65° C. or lower, and further preferably Tg+15° C. or higher and Tg+60° C. or lower.

The stretch ratio in the width direction is not particularly specified, but is preferably 3 times or more and 7 times or less. If the stretch ratio is less than 3 times, productivity may be decreased and deficiency of the orientation in the width direction deteriorates the irregularity of thickness in the width direction which may cause unfavorable variation in hardness in the width direction of the film roll. Further, if the stretch ratio exceeds 7 times, breakage is, unfavorably, prone to occur during film formation by stretching. Preferably, performing stretching in multiple stages such as two stages stretching, or three stages stretching improves condition of the irregularity of thickness in the width direction.

The heat setting temperature (heat treatment temperature) after the TD stretching is preferably 230 to 255° C. The heat setting temperature of higher than 255° C., which is unpreferable, melts the film to be broken due to a vicinity of the temperature to the melting point of polyester resin. And the melting roughens the surface of the film to be whiten, which deteriorates transparency of the film. When the heat setting temperature is lower than 230° C., the heat-shrinkage ratio becomes high in both the longitudinal direction and the width direction, and thermal dimensional stability during a vapor deposition process deteriorates.

In a heat relaxation treatment step, until the film has been shrunk due to heat relaxation, a binding force in the width direction decreases so that the film may slacken due to its own weight, or the film may bow due to an accompanying airflow, and thus, the film is very likely to move up and down. Therefore, in the heat relaxation step, the amount of change in the orientation angle and the amount of change in difference in oblique heat-shrinkage ratios of the resulting biaxially-oriented polyester film may greatly vary depending on the transport state of the film. For reducing such variation, for example, the film can be kept parallel by appropriately adjusting the speeds of winds blowing from upper and lower nozzles. The heat relaxation ratio in the width direction is preferably 4 to 8%. When the heat relaxation ratio is less than 4%, the heat-shrinkage ratio in the width direction of the resulting biaxially-oriented polyester film becomes high, and dimensional stability during a vapor deposition process unfavorably deteriorates. When the heat relaxation ratio is larger than 8%, bowing increases and slackening occurs, the irregularity of thickness in the width direction increases, and thus variation in hardness of the film roll unfavorably increases.

Figure 3:
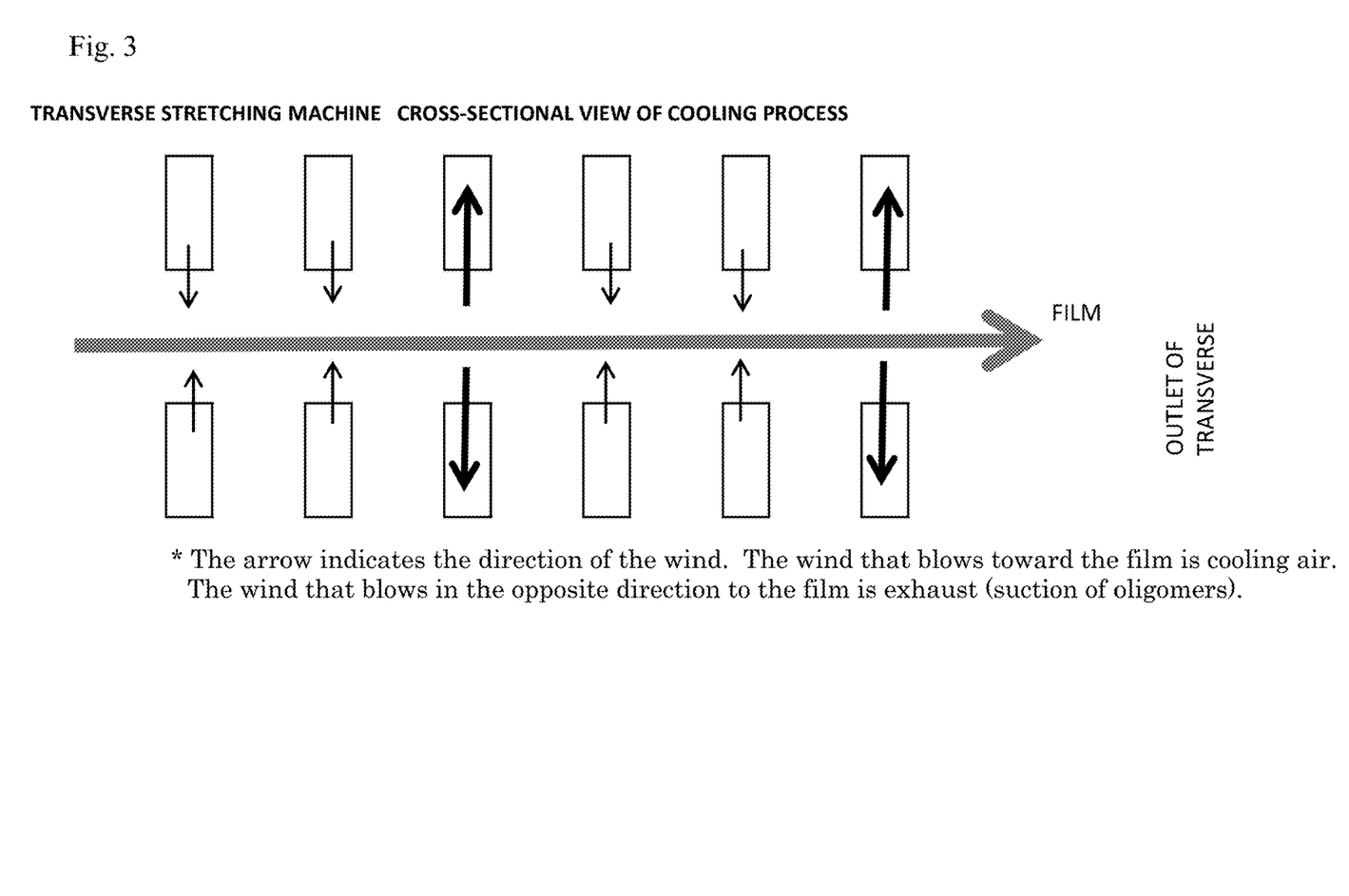
FIG. 3 shows an example of a cooling step in the film transverse stretching (TD) step of the present invention.

Further, when the film subjected to the heat treatment in the TD is cooled, oligomers are generated. If the oligomers adhere to the film, they become defects, unfavorably causing printing omission. Therefore, it is preferable to remove the oligomers in the TD or remove the oligomers at an outlet of the TD by using an adhesive roll or the like. As a specific example of removing the oligomers, a method as shown in FIG. 3 is preferable. Only blowing of cooling air on the film induces the generation of oligomers, and the generated oligomers fly in the zone and adhere to the film. Thus, after blowing of cooling air, a plenum duct that suctions the oligomers is provided to reduce the quantity of oligomers flying in the zone, and the oligomers are thereby less likely to adhere to the film.

The film formed by the above stretching method is wound by a winder to produce a master roll. Subsequently, the roll is placed in a slitter to slitting the film to a specified width and winding length and then slitted film is wound around a winding core to obtain biaxially-oriented polyester film. The winding core employs plastic core, metallic core, or paper core having nominal diameter of 3-inch, 6-inch, or 8-inch and the like. A preferable winding length and width of the film roll are as described above.

In addition, the following slitting conditions are preferably adopted so as to reduce sagging that occurs at the time of the slitting.

As specific slitting conditions, slitting is started at an initial tension of 70 N/m to 160 N/m, and preferably 80 N/m to 150 N/m, and at an initial surface pressure of 200 N/m to 400 N/m, and preferably 250 N/m to 350 N/m. If the initial tension is higher than 160 N/m, a thickness irregular portion of the concave portion is slightly stretched by the tension during the slitting, causing the sagging of the film roll. If the initial tension is 70 N/m or lower, the tension becomes insufficient when winding the film after slitting, and, the end faces of the film roll become uneven (so-called displacement of the end faces). Furthermore, after the winding length reaches 500 m, it is desirable to decrease the tension. More specifically, it is desirable to constantly decrease the tension to be correlated with the winding length so that the tension at a winding length of 300 m before finishing the slitting may be 50% to 80%, and preferably 60% to 70% of the initial tension. Further, it is preferable to apply a surface pressure over the entire winding length constantly as much as possible. The surface pressure is preferably within the initial surface pressure±5% or less, and further preferably within the initial surface pressure±3% or less, over the entire winding length.

Generally in an industrially produced film roll, a continuously produced film is continuously wound, and if film production conditions are constant, the degree of irregularity of thickness in the film width direction is substantially constant over the entire winding length. However, due to a minute change that occurs in each process in the film production, the degree of irregularity of thickness in the film width direction may slightly change over the entire winding length. The irregularity of thickness in the film width direction is preferably controlled over the entire winding length. It can be checked whether the irregularity of thickness is controlled over the entire winding length or not, by, for example, collecting samples of the film from the surface layer of the film roll per each winding length at a certain interval and measuring an irregularity of thickness of each of the samples. As the irregularity of thickness of the film roll of the present invention, an irregularity of thickness obtained by measuring a sample collected from a surface layer part of the film roll can be a representative value of the film roll. In the present invention, as described below in Examples, a sample is collected from a part where 5 m of the film has been removed from the surface layer of the film roll, and a measurement value of the sample is taken as a representative value. The preferred range of the irregularity of thickness in the film width direction in the surface layer of the film roll (irregularity of thickness in the maximum concave portion and in the entire width direction) is as described above.

A preferred embodiment of the present invention is that, when a sample is collected every 1000 m of the winding length and measured, the irregularity of thickness (irregularity of thickness in the maximum concave portion and in the entire width direction) falls within the predetermined range for all the samples. A preferred range of the irregularity of thickness in the film width direction in the entire length of the film roll (irregularity of thickness in the maximum concave portion and in the entire width direction) is as described above.

(Structure and Properties of Biaxially-Oriented Polyester Film)

In the biaxially-oriented polyester film of the present invention, the content of antimony in the film is preferably 10 ppm or less. Since antimony is a substance that is suspected of being carcinogenic, the smaller the content, the better. The content of antimony in the film is preferably 5 ppm, and more preferably 0 ppm. The content of antimony in the raw material resin used in the present invention is preferably 0 ppm, but is set to 10 ppm or less because there is a possibility of incorporation of antimony during the production.

In the biaxially-oriented polyester film of the present invention, the difference between the intrinsic viscosity of the polyester resin and the intrinsic viscosity of the polyester film is preferably 0.06 dl/g or less. This difference in intrinsic viscosity is an index of the degree of deterioration when the polyester resin is melt-extruded. If the difference in intrinsic viscosity is higher than 0.06 dl/g, the resin deteriorates in an extruder, resulting in generation of a foreign substance. The difference in intrinsic viscosity is preferably 0 dl/g, but it is difficult to make it 0 dl/g because the resin is substantially melted. The difference in intrinsic viscosity is preferably 0.05 dl/g or less, and more preferably 0.04 dl/g or less.

In order to control the difference in intrinsic viscosity as described above, in the present invention, it is preferable to control a resin temperature of an extruder to a temperature not lower than the melting point of the resin+2° C. and not higher than the melting point of the resin+6° C. to perform extrusion. When the extrusion temperature is lower than the melting point+2° C., the resin does not melt, and the unmelted material is discharged and, unfavorably, becomes a foreign substance. When extrusion is performed at a temperature higher than the melting point+6° C., the resin is thermally deteriorated and becomes a foreign substance.

In the biaxially-oriented polyester film of the present invention, the number of defects with a size of 1 mm or more is preferably 1 or less per 10000 square meters of the film. By thus reducing the number of defects with a size of 1 mm or more per large area of 10000 square meters to 1 or less, the printability becomes very good. When the number of defects due to foreign substances is large, omission of ink may unfavorably occur in printing. A smaller number of defects with a size of 1 mm or more is preferable. The number of defects with a size of 1 mm or more is more preferably 0.5 or less, further preferably 0.3 or less, particularly preferably 0.1 or less, and most preferably 0. In the present invention, the number of defects with a size of 1 mm or more is set to 1 or less since there is a possibility of incorporation of a foreign substance when an unexpected trouble happens.

The arithmetic mean roughness of the surface of the biaxially-oriented polyester film of the present invention is preferably 0.02 μm or more and 0.05 μm or less. If the arithmetic mean roughness is less than 0.02 μm, blocking, that is, adhesion of the film, occurs in the film roll, and abnormal noise (sound of the adhered film peeling off) may be generated during unwinding, or the film may break. If the arithmetic mean roughness exceeds 0.05 μm, in processing such as vapor deposition, omission of a deposited thin film is likely to occur, and the gas barrier property may be deteriorated.

Further, the thickness of the biaxially-oriented polyester film of the present invention is preferably 5 µm or more and 40 µm or less. The upper limit of the film thickness is more preferably 35 µm or less, and further preferably 30 µm or less. Since only the thickness of 5 µm or more was examined in the present invention, the lower limit of the film thickness is set to be 5 µm or more. Moreover, the larger film thickness accompanies higher stiffness and less sagging, which is a preferable tendency with no problem, but the larger film thickness goes against environmental response of the reduction in thickness. If the film thickness is smaller, sagging is more likely to occur, whereby the smaller film thickness accompanies further difficulties in the embodiments of the present invention.

Moreover, both of a static friction coefficient and a dynamic friction coefficient between the film surfaces of the winding outside and the winding inside of the biaxially-oriented polyester film of the present invention are preferably 0.1 or more and 0.8 or less. If these friction coefficients are less than 0.1, the film is so slippery that displacement of the end face may be caused. If the friction coefficients are more than 0.8, the amount of air involved during the slitting is increased, and sagging or wrinkling is likely to occur due to release of the air in the concave portion of the film roll. The friction coefficients are preferably 0.13 or more and 0.77 or less, and further preferably 0.16 or more and 0.74 or less.

(Properties of Biaxially-Oriented Polyester Film Roll)

The winding length of the biaxially-oriented polyester film roll of the present invention is preferably 8000 m or more and 80000 m or less. During processing such as printing or vapor deposition, a longer winding length allows a frequency of changing rolls to be reduced, so that working efficiency can be increased. The winding length is preferably 10000 m or more, further preferably 12000 m or more, and particularly preferably 14000 m or more. The upper limit thereof is not particularly determined, and a longer winding length is better. However, since the inventors can examine up to the winding length of 80000 m, the upper limit of the winding length is set to be 80000 m. As the winding length of the film roll becomes longer, the area of the film increases, and opportunities of generating defects due to sagging may increase, so that the longer winding length of the film roll accompanies further difficulties in the embodiments of the present invention.

Further, the width of the biaxially-oriented polyester film roll of the present invention is preferably 500 mm or more and 4000 mm or less. The upper limit thereof is not particularly determined, and a larger width of the film roll is preferred because losses in a printing process can be reduced. However, since the inventors can examine up to the width of 4000 mm, the upper limit of the width is set to be 4000 mm. A larger width of the film roll is preferred because the efficiency in processing such as printing is improved as described above. The width is preferably 700 mm or more, further preferably 900 mm or more, and particularly preferably 1100 mm or more. As the width of the film roll becomes larger, the area of the film increases, and opportunities of generating defects due to sagging may increase, so that the larger width of the film roll accompanies further difficulties in the embodiments of the present invention.

The biaxially-oriented polyester film roll of the present invention has a position where a thickness pattern makes a concave portion in an irregularity of thickness in the width direction of the film roll. At a concave portion that has a maximum thickness difference (maximum concave portion), the irregularity of thickness in the maximum concave portion, which is obtained by the following equation 1 from the maximum thickness difference in the maximum concave portion and an average film thickness, is preferably 10% or less (its example will be shown in FIG. 1).

Figure 1:
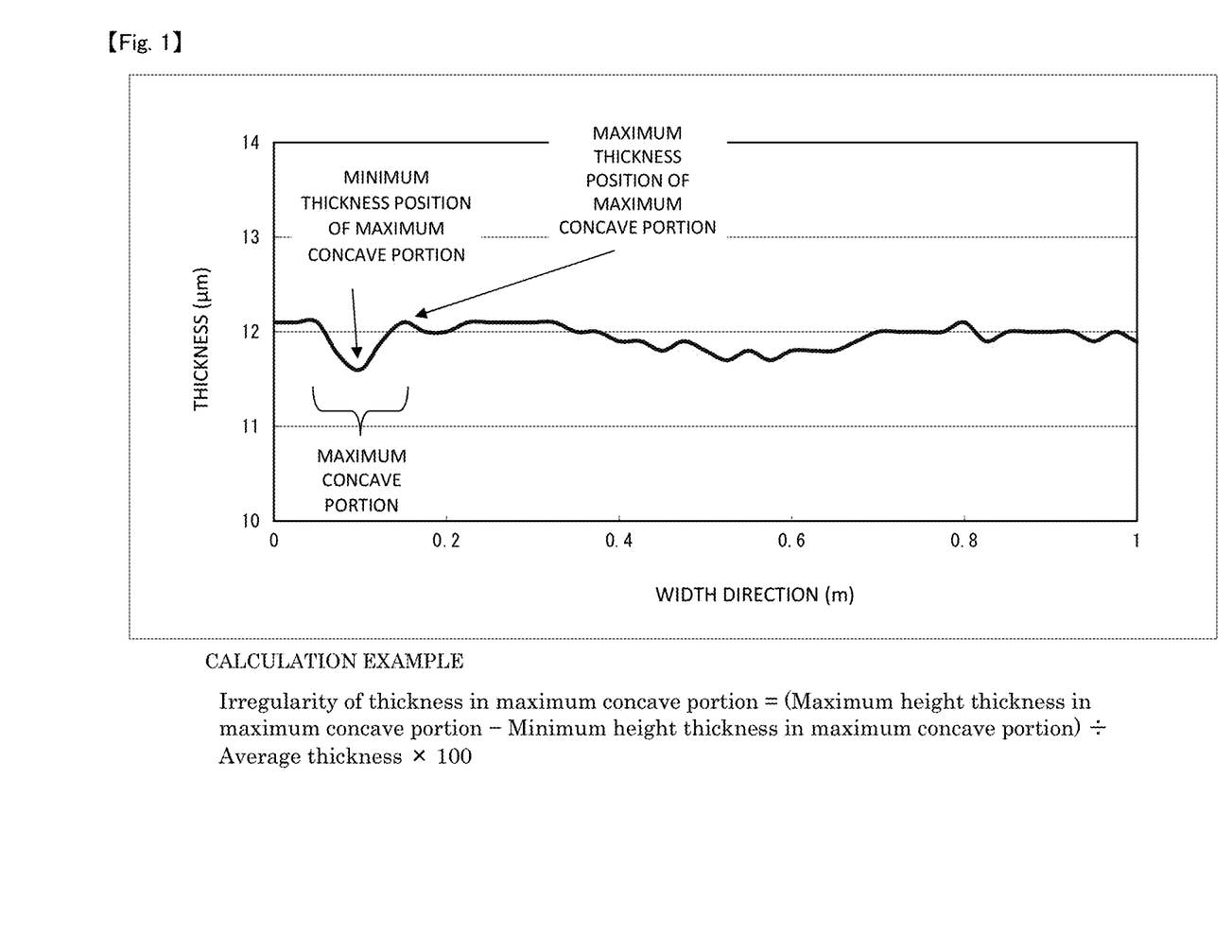
FIG. 1 shows a maximum recess in the thickness unevenness in the film width direction of the present invention.

Irregularity of thickness in Concave Portion=(Maximum Height Thickness in Concave Portion−Minimum Height Thickness in Concave Portion)÷Average Thickness×100(%)  (Equation 1)

The concave portion in the present invention denotes a part having a thickness pattern of a mountain portion-a valley portion-a mountain portion, where, in an irregularity of thickness in the film width direction measured by a continuous contact-type thickness gauge as described below, the mountain portion denotes a point at which the thickness starts to be decreased along both of measurement directions, and the valley portion denotes a point at which the thickness starts to be increased along both of the measurement directions. A film which does not have such a thickness pattern, that is, a film having no concave portion is not included in the present invention. In two mountain portions and one valley portion in the concave portion, a larger value of thickness differences between the respective mountain portions and the valley portion (if they are the same values, the both values) is called as the maximum thickness difference in the concave portion.

If the irregularity of thickness in the maximum concave portion is larger than 10%, air is involved and enclosed into a film roll while slitting the film at the location of the concave portion and winding the film as a film roll, and the air is released afterward during storage of the film roll, thereby causing wrinkling and sagging. Further, the concave portion has a thickness smaller than the thicknesses of other positions along the width direction, and thus is stretched in a longitudinal direction by tension applied while slitting and winding the film as the film roll. Thus, at the position of the concave portion on the film roll, a length along the longitudinal direction is larger than the lengths of other positions along the width direction, whereby sagging occurs at the position. According to the investigation by the inventors of the present invention, it has been found that, particularly when a thickness difference between the concave portion and both ends thereof is large, such sagging becomes apparent. The irregularity of thickness in the maximum concave portion is preferably 9% or less, and further preferably 8% or less. It is more preferable that the irregularity of thickness in the maximum concave portion be smaller, and 3% was the smallest in a test carried out by the inventors.

The above-described irregularity of thickness in the concave portion should be measured by a continuous contact-type thickness gauge which will be shown below in Examples. For example, as shown in Patent Document 4, if measuring thicknesses is performed at an interval of 30 mm to 500 mm along a measurement direction, a maximum thickness difference in a concave portion may be present at an unmeasured location, and a thickness difference at a precise concave portion is difficult to be obtained. The irregularity of thickness in the present invention denotes a value obtained by measurement using a continuous contact-type thickness gauge.

Further, in the irregularities of thicknesses in the film width direction of samples, which are obtained by sampling from the surface layer of the film roll of the biaxially-oriented polyester film of the present invention at an interval of 1000 m along a winding length, the irregularities of thicknesses of all of the samples, which are obtained from their maximum thickness differences in their maximum concave portions and the film average thicknesses, are preferably 10% or less.

As described above, if the irregularity of thickness in the maximum concave portion is larger than 10%, air is involved and enclosed into a film roll while slitting the film at the location of the concave portion and winding the film as the film roll, and the air is released afterward during storage of the film roll, thereby causing wrinkling and sagging. Further, the concave portion has a thickness smaller than the thicknesses of other positions along the width direction, and thus is stretched in a longitudinal direction by tension applied during the slitting. Thus, at the position of the concave portion in the film roll, a length along the longitudinal direction becomes larger than the lengths of the other positions along the width direction, whereby sagging occurs at the position. According to the investigation by the inventors of the present invention, it has been found that, particularly when a thickness difference between the concave portion and both ends thereof (the thickness difference between the valley portion and the mountain portions) is large, such sagging becomes apparent. Therefore, the irregularity of thickness in the concave portion along the width direction of the roll is important. The irregularity of thickness in the maximum concave portion is preferably 9% or less, and further preferably 8% or less.

Further, in the maximum concave portion in the thickness pattern along the width direction of the polyester film roll of the present invention, an absolute value of a difference between refractive indices in the width direction at the maximum thickness position of either of the both ends of the concave portion (a mountain portion having a larger thickness between the above-described two mountain portions) and at the minimum thickness position of the concave portion (the above-described valley portion) is preferably 0.01 or less. If the absolute value of the difference between the refractive indices in the width direction at the maximum thickness position of either of the both ends of the concave portion and at the minimum thickness position in the concave portion is higher than 0.01, the minimum thickness position and the maximum thickness position in the concave portion have different stretchability along the longitudinal direction, so that these positions are stretched differently in the longitudinal direction by the tension applied during the slitting. Thereby, at the position where a length in the longitudinal direction is increased during the film rolling, sagging occurs. An absolute value of the above difference between the refractive indices in the width direction is preferably 0.008 or less, and further preferably 0.006 or less. A lower absolute value of the above difference between the refractive indices in the width direction is preferable, and 0.0003 was the lowest in the test carried out by the inventors.

When a hardness of an outermost surface layer of the polyester film roll of the present invention is measured at an interval of 50 mm along the film width direction, the average hardness is preferably in the range of 500 or more and 700 or less, and the variation in hardness is preferably 10% or more and 20% or less. The "outermost surface layer" of the film roll refers to a roll surface portion of the film roll after the film has been unwound from the roll and removed by 5 m from the edge in the longitudinal direction of the film. The hardness is measured using a hardness tester PAROtester 2 manufactured by Swiss Proceq. If the winding hardness of the surface layer of the film roll is less than 500, for example, when the film roll is stored in a warehouse for half a year, air involved in the film roll during slitting is released, and the film roll may sag. If the winding hardness of the surface layer of the film roll is more than 700, the winding of the film roll hardens, and the concave portion as described above is compressed, leading to sagging. The winding hardness of the surface layer of the film roll is preferably 530 or more and 670 or less, and more preferably 560 or more and 640 or less.

Further, it is preferable that the variation in hardness measured in the width direction of the film roll be 10% or more and 20% or less. If the variation in hardness is more than 20%, for example, when the film roll is stored in a warehouse for half a year, the irregularity of thickness in the film width direction increases, and a tension difference in the width direction occurs in a slit apparatus, and as a result, sagging is likely to occur after storage. The variation in hardness measured in the width direction of the film roll is preferably less than 10%, and since the lower limit of the variation in hardness examined in the present invention is 10%, the lower limit is set to be 10%. The upper limit of the variation in winding hardness in the width direction is preferably 19% or less, and more preferably 18% or less.

EXAMPLES

Hereinafter, the present invention will be described in more detail by way of examples. However, the present invention is not limited in any way to the form of these examples, and may be changed as appropriate without departing from the purpose of the present invention. The compositions of the raw materials used in the examples and comparative examples, and the stretching method and manufacturing conditions of the films in the examples and comparative examples are shown in the following tables.

The film evaluation method is as follows.
[Tg (Glass Transition Point), Tm (Melting Point)]
Using a differential scanning calorimeter (DSC220 manufactured by Seiko Instruments & Electronics Ltd.), 5 mg of an unstretched film was put in a sample pan, the lid of the pan was closed, and the temperature was raised at a temperature rise rate of 10° C./minute from −40° C. to 300° C. in a nitrogen gas atmosphere to conduct a measurement. Tg (° C.) and Tm (° C.) were obtained based on JIS-K 7121-1987.
[Intrinsic Viscosity (IV)]
0.2 g of polyester was dissolved in 50 ml of a solvent mixture of phenol/1,1,2,2-tetrachloroethane (60/40 (weight ratio)), and the intrinsic viscosity was measured at 30° C. using an Ostwald viscometer. The unit is dl/g.
[Content of Each Atom in Polyester Film]
The content of each atom was quantified by the methods shown below.
(a) Antimony Atom
A sample (1 g) was subjected to wet decomposition in a mixed solution of sulfuric acid/aqueous hydrogen peroxide solution. After that, sodium nitrite was added thereto to change an Sb atom to $Sb^{5+}$, and Brilliant Green was added to produce a blue complex with Sb. This complex was extracted with toluene. Then, absorbance thereof at 625 nm wavelength was measured using an absorptiometer (UV-150-02 manufactured by Shimadzu), and the amount of Sb atom in the sample was determined by a colorimetry using a previously-prepared calibration curve.
(b) Phosphorus Atom
A sample (1 g) was subjected to dry incineration decomposition in the presence of sodium carbonate or wet decomposition in a mixed solution of sulfuric acid/nitric acid/perchlorate or a mixed solution of sulfuric acid/aqueous hydrogen peroxide solution to convert a phosphorus compound to orthophosphoric acid. After that, orthophosphoric acid was allowed to react with molybdate in a 1 mol/L sulfuric acid solution, and the resulting phosphomolybdic acid was reduced with hydrazine sulfate to prepare heteropoly blue. Absorbance thereof at 830 nm wavelength was measured using an absorptiometer (UV-150-02 manufactured by Shimadzu). The amount of phosphorus atom in the sample was determined using a previously-prepared calibration curve.

(c) Aluminum Atom

A sample (0.1 g) was dissolved in 6M hydrochloric acid solution, and the resulting solution was allowed to stand for one day and then diluted with pure water to prepare a 1.2M hydrochloric acid solution for measurement. The amount of aluminum atom in the sample was determined from the above-prepared solution sample by means of a high-frequency plasma emission spectrometry.

[SRa (Arithmetic Mean Roughness) for Film Surface]

The surface roughness of the film was measured by the following method.

Apparatus: Scanning type confocal laser microscope (Olympus LEXT)
Type of laser: 405 nm semiconductor laser
Objective lens: ×50 magnification
Imaging mode: High accuracy
A confocal image of a measurement surface was captured by the above apparatus under the above conditions.
Surface Roughness Analysis
Measurement range: 256 μm length×256 μm width
Analysis software: OLS4100
No cutoff A surface roughness analysis was performed under the above conditions, and an arithmetic mean roughness (SRa) was measured. The measurement was performed 10 times at different measurement positions, and the average value thereof was calculated. However, in the event of a partial abnormality such as a scratch being clearly observed from the image, the measured value at such an abnormal part was not included, and the measurement was performed again while avoiding the abnormal part.

[Irregularity of Thickness in Entire Width Direction]

A roll was placed in a slitter. Subsequently, after removing 5 m from a surface layer of the roll, a sample of an entire width along the width direction and 40 mm along the longitudinal direction of the film roll was taken, a thickness thereof was measured continuously at a rate of 5 m/s along the width direction by a continuous contact-type thickness gauge manufactured by MIKURON. An irregularity of thickness in the width direction of the film was calculated from the following equation (1), where, at the time of the measurement, a maximum thickness is denoted by Tmax., a minimum thickness is denoted by Tmin., and an average thickness is denoted by Tave.

$$\text{Irregularity of thickness} = \{(T\text{max.} - T\text{min.})/T\text{ave.}\} \times 100(\%) \quad \text{Equation (1)}$$

[Irregularity of Thickness in Concave Portion]

The above-described continuous contact thickness along the width direction was obtained, and a position that was a maximum concave portion as shown in FIG. 1 was found. An irregularity of thickness in the maximum concave portion was obtained by the following equation (2). If heights of both ends of the maximum concave portion were different, a higher value was selected for obtaining the irregularity of thickness.

Irregularity of thickness in maximum concave portion=(Maximum height thickness in maximum concave portion−Minimum height thickness in maximum concave portion)÷Average thickness× 100(%)     Equation (2)

[Irregularity of Thickness in Maximum Concave Portion in Roll Width Direction along Roll Winding Length]

A roll was placed in a slitter. Subsequently, after removing 5 m from a surface layer of the roll, an irregularity of thickness in the maximum concave portion in the roll width direction was measured by the above-described method. After the measurement, 1000 m of the film was rewound by the slitter, and an irregularity of thickness in the concave portion along the roll width direction was measured by the above-described method. Rewinding of 1000 m and measurement of an irregularity of thickness in a maximum concave portion along the roll width direction were repeated.

[Difference in Refractive Index between Maximum Concave Portion and Both Ends of Maximum Concave Portion]

Refractive indices of the film in the width direction in the above-described maximum concave portion and at the higher location of the both ends of the maximum concave portion were measured by an Abbe refractometer. Then, a difference in refractive index was obtained by the following equation (3), and an absolute value thereof was obtained.

Difference in refractive index between maximum concave portion and both ends of maximum concave portion=|Refractive index in maximum concave portion in width direction−Refractive index at higher location of both ends of maximum concave portion in width direction|     Equation (3)

[Coefficient of Friction]

In accordance with JIS K-7125, a static friction coefficient and a dynamic friction coefficient when the front surface and the rear surface of the film were joined were determined in an environment at 23° C. and 65% RH using a tension tester (TENSILON manufactured by ORIENTEC CORPORATION). The weight of a sled (weight) around which the film on an upper side was wound was 1.5 kg, and the size of the bottom area of the sled was 63 mm in length×63 mm in width. The tensile rate in measurement of friction was 200 mm/min.

[Evaluation on Sagging]

From the film roll, a sample of an entire width along the width direction and 4 m or more and 6 m or less along the longitudinal direction was taken, and was put on a flat table. At this time, if a belt-shaped position having even a little poorer flatness continuously along the longitudinal direction than that of other part was visually observed, this position was determined as sagging. The evaluation was performed according to the following criteria. The same evaluation was performed after storage in a warehouse at a temperature of 23° C. for one year.

No sagging observed: Good
Sagging observed at one or more positions: Poor

[Evaluation on Winding Hardness]

Winding hardness was measured at an interval of 50 mm from an end portion along the width direction of the roll using a hardness tester PAROtester 2 manufactured by Swiss Proceq. An average value of the values obtained by the measurement along the width direction of the roll was used as a measurement value. Further, a variation in hardness was obtained by the following equation (4).

(Maximum value of winding hardness in width direction−Minimum value of winding hardness in width direction)÷Average winding hardness× 100(%)     Equation (4)

[Evaluation on Wrinkles on Film Roll]

Immediately after production of a polyester film roll and after storage in a warehouse at a temperature of 23° C. for one year, the film roll was evaluated by visual observation for wrinkles on the surface layer of the roll according to the following criteria. The film rolls given "good" and "average" were judged as acceptable.

Good: No wrinkle is observed.

Average: Little wrinkles are observed, but the wrinkles disappear when a tension of about 20 N/m is applied to the film drawn from the roll.

Poor: Strong wrinkles are observed, and the wrinkles do not disappear even if a tension of about 20 N/m is applied to the film drawn from the roll.

[Number of Defects]

The obtained film roll was rewound using a rewinder. When the film roll was rewound, the number of defects was investigated using a defect detector (model F MAX MR) manufactured by FUTEC. Then, the number of defects with a size of 1 mm or more was determined either in the longitudinal direction or in the transverse direction. From the number of all the defects, the number of defects per 10000 square meters was calculated by the following equation (5).

Number of defects=Number of all defects÷{Film roll width (m)×Film roll winding length (10000 m)}  Equation (5)

[Printing]

Immediately after production of a polyester film roll and after storage in a warehouse at a temperature of 23° C. for one year, gravure printing was performed on the film roll using a gravure printing machine (manufactured by Higashitani Tekkosho) at a speed of 300 m/min with halftone dots of 5%. At this time, an ink prepared by mixing a gravure printing ink (manufactured by Toyo Ink Co., Ltd.; trade name: Fine Star R92 Black) and a diluting solvent (manufactured by Toyo Ink Co., Ltd.; trade name: SL302) at a ratio of 77:23 was used. The obtained print sample was rewound using a rewinder. When the print sample was rewound, the number of printing omissions was investigated using a defect detector (model F MAX MR) manufactured by FUTEC. Then, the number of printing omissions with a size of 1 mm or more was determined either in the longitudinal direction or in the transverse direction. From the number of all the printing omissions, the number of printing omissions per 10000 square meters was calculated by the following equation (6).

Number of printing omissions=Number of all printing omissions÷{Film roll width (m)×Film roll winding length (10000 m)}  Equation (6)

<Preparation of Polymerization Catalyst Solution>

(Ethylene Glycol Solution of Phosphorus Compound)

2.0 liters of ethylene glycol was placed at normal temperature and normal pressure in a flask equipped with a nitrogen introducing tube and a cooling tube, and then 200 g of Irganox1222 (manufactured by BASF) represented by the chemical formula (4) as a phosphorus compound was added thereto with stirring at 200 rpm in a nitrogen atmosphere. After adding additional 2.0 liters of ethylene glycol, the set temperature of a jacket was changed to 196° C. to raise a temperature, and stirring was performed under reflux for 60 minutes from when the inner temperature reached 185° C. or higher. Then, heating was ceased, and the solution was immediately removed from the heat source and cooled to 120° C. or lower within 30 minutes while the nitrogen atmosphere was retained.

(Ethylene Glycol Solution of Aluminum Compound)

5.0 liters of pure water was placed at normal temperature and normal pressure in a flask equipped with a cooling tube, 200 g of basic aluminum acetate (hydroxyaluminum diacetate) was added thereto in the form of slurry with pure water with stirring at 200 rpm. Further, pure water was added such that the overall volume would become 10.0 liters, and stirring was performed at normal temperature and normal pressure for 12 hours. Then, the set temperature of a jacket was changed to 100.5° C. to raise a temperature, and then stirring was performed under reflux for 3 hours from when the inner temperature reached 95° C. or higher. Stirring was ceased, and the solution was allowed to cool to room temperature. At this time, when undissolved particles were observed, the solution was filtered through a glass filter (3G) to obtain an aqueous solution of the aluminum compound.

Subsequently, 2.0 liters of the aqueous solution of the aluminum compound and 2.0 liters of ethylene glycol were placed at normal temperature and normal pressure in a flask equipped with a distillation apparatus, and stirring was performed for 30 minutes at 200 rpm, thereby to obtain a homogeneous mixed solution of water/ethylene glycol. Then, the set temperature of a jacket was changed to 110° C. to raise a temperature, and water was evaporated away from the solution. When the amount of the evaporated water reached 2.0 liters, heating was ceased, and the solution was allowed to cool to room temperature, thereby to obtain an ethylene glycol solution of the aluminum compound.

In the following description, "part(s)" represents "part(s) by mass".

2130 parts of terephthalic acid, 1955 parts of ethylene glycol, and 0.7 parts of triethylamine were placed in a reactor equipped with a stirrer, a thermometer and a condenser for distillation, the temperature was gradually raised from 220° C. to 250° C. under pressurization at 0.35 MPa, and esterification was performed while removing an evaporated water to an outside of the system. Subsequently, as the polymerization catalyst solution, a mixed solution of the ethylene glycol solution of the phosphorus compound and the ethylene glycol solution of the aluminum compound was added thereto so that the amount in terms of phosphorus atom was 0.047 mol % and the amount in terms of aluminum atom was 0.021 mol % with respect to the dicarboxylic acid component in the polyester resin. Then, an initial polymerization under a reduced pressure up to 1.3 kPa was performed over one hour, and at the same time, the temperature was raised up to 270° C. Further, a latter polymerization was performed at 0.13 kPa or less to obtain polyester resin.

The polyesters used in Examples and Comparative Examples are as follows:

Polyester 1: Polyethylene terephthalate (IV: 0.73 dl/g);

Polyester 2: Polyethylene terephthalate (IV: 0.73 dl/g) in which $SiO_2$ (spherical silica having its average particle diameter of 2 μm) was added as a lubricant at a ratio of 7,500 ppm to polyester in the production of the Polyester 1;

TABLE 1

| | Raw material composition of polyester (mol %) | | | |
| --- | --- | --- | --- | --- |
| | Dicarboxylic acid component DMT | Polyhydric alcohol component EG | Amount of lubricant added (ppm) | IV (dl/g) |
| Polyester 1 | 100 | 100 | 0 | 0.73 |
| Polyester 2 | 100 | 100 | 7500 | 0.73 |

DMT: Dimethyl terephthalate
EG: Ethylene glycol

Example 1

Polyester 1 and Polyester 2 described above were mixed at a weight ratio of 96:4 and introduced into an extruder. Then, this mixed resin was melted at 270° C., cooled to 260° C., extruded from a T-die, and wound around a rotating metal roll that was cooled to have a surface temperature of 30° C. to be rapidly cooled to obtain an unstretched film having a thickness of 220 μm. The take-up speed (rotational speed of the metal roll) of the unstretched film at this time was about 80 m/min. The unstretched film had Tg of 75° C. and Tm of 256° C. A laser cleaner was installed on the cooling metal roll to prevent foreign substances from adhering.

Figure 2:
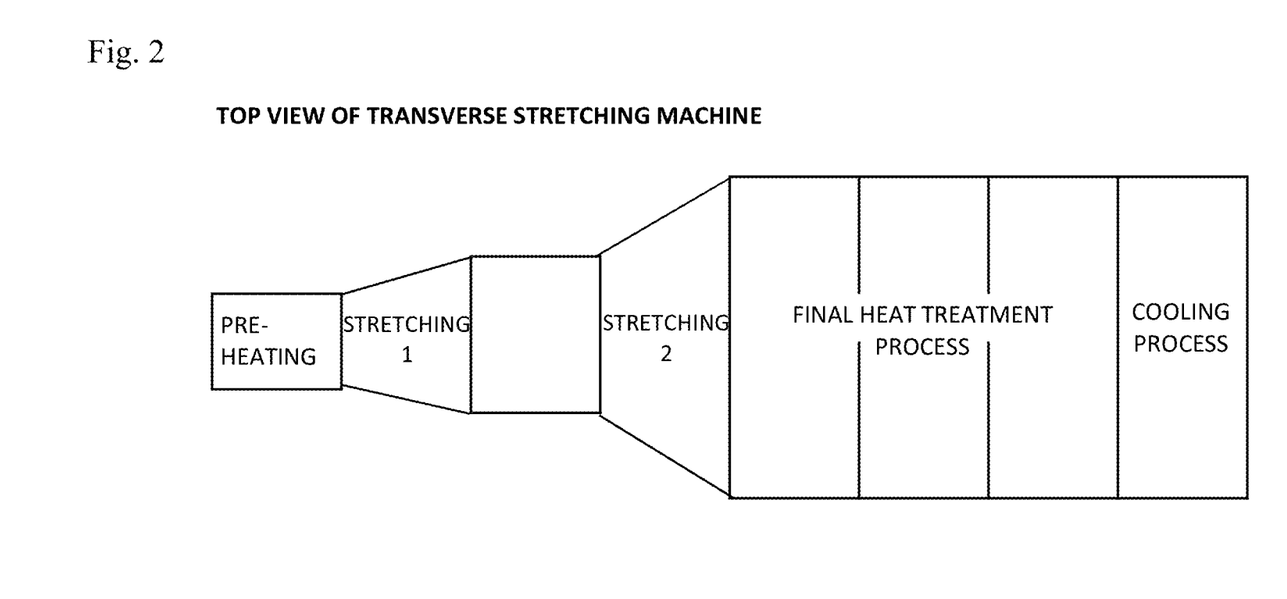
FIG. 2 shows an example of a film transverse stretching (TD) step of the present invention.

The obtained unstretched sheet was heated to 110° C. and stretched in the longitudinal direction at a total stretch ratio of 4.5 times in two stages with a first stage at 1.5 times and a second stage at 3 times. Subsequently, the film was stretched in the width direction at a temperature of 130° C. and a total stretch ratio of 4.6 times in two stages with a first stage at 2 times and a second stage at 2.3 times at transverse stretching step (herein after called as tenter) (see FIG. 2). After stretching the film in the width direction at a stretch ratio of 4.6 times, the film was subjected to a heat setting treatment at 243° C. and 5% heat relaxation treatment in the width direction. After heat relaxation treatment, the film was cooled to below 50° C. in the tenter and at the outlet of the tenter, oligomer was sucked over the entire width of the film in width direction by the exhaust device shown in FIG. 3. Next, after cutting and removing both ends of the resulting stretched film, the film was subjected to corona discharge treatment and wound into a roll with a winder, whereby a master roll of a biaxially-oriented polyester film having a thickness of 12 μm, a width of 8 m and winding length of 85000 m was produced.

The obtained biaxially-oriented polyester film was slitted by a slitter to obtain 4000 mm width size, 2000 mm width size and 1000 mm width size with winding length of 80000 m each using 6-inch metallic core.

As specific slitting conditions, initial tension was 150 N/m, and initial surface pressure was 330 N/m when starting the slitting. The tension was decreased at a constant rate so that the tension might be 150 to 80 N/m while the winding length was 1000 m to 79000 m. Further, the slitting was performed so that the surface pressure might be constant at 330 N/m. The conditions of film production process and the slitting conditions are shown in Table 2.

Then, properties of the obtained films were evaluated by the above-described methods. Evaluation results are shown in Table 3 and Table 4. The films that exhibited the aimed properties were obtained, and the results on sagging were satisfactory. As results of the evaluation on sagging of all the samples collected every 1000 m, in addition to the results in Table 3 (of surface layers of the film rolls), all the samples of the above-described three film rolls were evaluated as "good" (without sagging).

Example 2

A biaxially-oriented polyester film roll was obtained in the same manner as in Example 1 except that Polyester 1 and Polyester 2 were mixed at a weight ratio of 94:6 and introduced into an extruder. The film production conditions and slitting conditions are shown in Table 2, and the evaluation results are shown in Table 3 and Table 4. The obtained film was a good-quality film.

Example 3

A biaxially-oriented polyester film roll was obtained in the same manner as in Example 1 except that thickness of the film was changed to 6 μm and winding length of the roll was changed to 30,000 m. The film production conditions and slitting conditions are shown in Table 2, and the evaluation results are shown in Table 3 and Table 4. The obtained film was a good-quality film.

Comparative Example 1

As slitting conditions, initial tension was 120 N/m, and initial surface pressure was 280 N/m when starting the slitting. The tension was decreased at a constant rate so that the tension might be 120 to 50 N/m while the winding length was 1000 m to 79000 m. Further, the slitting was performed so that the surface pressure might be constant at 280 N/m. The experiment was conducted in the same manner as in Example 1 except the slitting conditions. The conditions of film production process and the slitting conditions are shown in Table 2. Evaluation results are shown in Table 3 and Table 4. The film roll had low winding hardness and the film roll exhibited inferior in the appearance of the film roll and the looseness of the film after storage in a warehouse. In addition, the film had a large number of printing omissions after long-term storage.

Comparative Example 2

An unstretched sheet obtained in the same manner as in Example 1 was heated to 110° C. and stretched in the longitudinal direction at a total stretch ratio of 3 times in two stages with a first stage at 1.5 times and a second stage at 2 times. Subsequently, the film was stretched in the width direction at a temperature of 140° C. and a total stretch ratio of 4.6 times in two stages with a first stage at 2 times and a second stage at 2.3 times at a temperature of 170° C. at transverse stretching step (herein after called as tenter). After stretching the film in the width direction at a stretch ratio of 4.6 times, the film was subjected to a heat setting treatment at 243° C. and 5% heat relaxation treatment in the width direction. After heat relaxation treatment, the film was cooled to below 50° C. in the tenter and at the outlet of the tenter, oligomer was sucked over the entire width of the film in width direction by the exhaust device shown in FIG. 3. Next, after cutting and removing both ends of the resulting stretched film, the film was subjected to corona discharge treatment and wound into a roll with a winder, whereby a master roll of a biaxially-oriented polyester film having a thickness of 12 μm, a width of 8 m and winding length of 35000 m was produced.

As specific slitting conditions, initial tension was 150 N/m, and initial surface pressure was 330 N/m when starting the slitting. The tension was decreased at a constant rate so that the tension might be 150 to 80 N/m while the winding length was 1000 m to 29000 m. Further, the slitting was performed so that the surface pressure might be constant at 330 N/m to obtain the film roll having winding length of 30000 m. The conditions of film production process and the slitting conditions are shown in Table 2. Evaluation results are shown in Table 3 and Table 4.

the obtained polyester film roll was a film of inferior quality with poor thickness unevenness in the width direction, large variation in winding hardness, poor appearance and looseness of the film roll.

TABLE 2

(Conditions of film production process)

| | | Glass transition | | Extrusion process | Longitudinal stretching process | | |
|---|---|---|---|---|---|---|---|
| | Resin composition (Weight ratio) | temperature of raw material (° C.) | Melting point of raw material (° C.) | Extrusion temperature (° C.) | 1st stage stretch ratio | 2nd stage stretch rati | Total stretch ratio |
| Example 1 | Polyester 1:Polyester 2 = 96:4 | 75 | 256 | 260 | 1.5 | 3 | 4.5 |
| Example 2 | Polyester 1:Polyester 2 = 94:6 | 75 | 256 | 260 | 1.5 | 3 | 4.5 |
| Example 3 | Polyester 1:Polyester 2 = 96:4 | 75 | 256 | 260 | 1.5 | 3 | 4.5 |
| Comparative Example 1 | Polyester 1:Polyester 2 = 96:4 | 75 | 256 | 260 | 1.5 | 3 | 4.5 |
| Comparative Example 2 | Polyester 1:Polyester 2 = 96:4 | 75 | 256 | 260 | 1.5 | 2 | 3 |

(Conditions of film production process)

| | Transverse stretching process | | | | | | |
|---|---|---|---|---|---|---|---|
| | 1st stage stretch temperature (° C.) | 1st stage stretch ratio | 2nd stage stretch temperature (° C.) | 2nd stage stretch ratio | Total stretch ratio | Heat treatment temperature (° C.) | Relaxation ratio (%) |
| Example 1 | 130 | 2 | 130 | 2.3 | 4.6 | 243 | 5 |
| Example 2 | 130 | 2 | 130 | 2.3 | 4.6 | 243 | 5 |
| Example 3 | 130 | 2 | 130 | 2.3 | 4.6 | 243 | 5 |
| Comparative Example 1 | 130 | 2 | 130 | 2.3 | 4.6 | 243 | 5 |
| Comparative Example 2 | 140 | 2 | 170 | 2.3 | 4.6 | 243 | 5 |

(Slitting conditions)

| | Slitting conditions | | |
|---|---|---|---|
| | Initial tension (N/m) | Final tension (N/m) | Surface pressure (N/m) |
| Example 1 | 150 | 80 | 330 |
| Example 2 | 150 | 80 | 330 |
| Example 3 | 150 | 80 | 330 |
| Comparative Example 1 | 120 | 50 | 280 |
| Comparative Example 2 | 150 | 80 | 330 |

TABLE 3

| | Width of Film roll (mm) | Winding length of film roll (m) | Average thickness (μm) | Content of antimony (ppm) | Content of phosphorus (ppm) | Content of aluminum (ppm) | Glass transition temperature of film (° C.) | Melting point of film (° C.) | IV (dl/g) |
|---|---|---|---|---|---|---|---|---|---|
| Example 1 | 4000 | 80000 | 12 | 0 | 36 | 13 | 75 | 256 | 0.69 |
| | 2000 | 80000 | 12 | 0 | 36 | 13 | 75 | 256 | 0.69 |
| | 1000 | 80000 | 12 | 0 | 36 | 13 | 75 | 256 | 0.69 |
| Example 2 | 4000 | 80000 | 12 | 0 | 36 | 13 | 75 | 256 | 0.69 |
| | 2000 | 80000 | 12 | 0 | 36 | 13 | 75 | 256 | 0.69 |
| | 1000 | 80000 | 12 | 0 | 36 | 13 | 75 | 256 | 0.69 |
| Example 3 | 4000 | 30000 | 6 | 0 | 36 | 13 | 75 | 256 | 0.69 |
| | 2000 | 30000 | 6 | 0 | 36 | 13 | 75 | 256 | 0.69 |
| | 1000 | 30000 | 6 | 0 | 36 | 13 | 75 | 256 | 0.69 |

TABLE 3-continued

| | | | | | | | | | |
|---|---|---|---|---|---|---|---|---|---|
| Comparative Example 1 | 4000 | 80000 | 12 | 0 | 36 | 13 | 75 | 256 | 0.69 |
| | 2000 | 80000 | 12 | 0 | 36 | 13 | 75 | 256 | 0.69 |
| | 1000 | 80000 | 12 | 0 | 36 | 13 | 75 | 256 | 0.69 |
| Comparative Example 2 | 4000 | 30000 | 12 | 0 | 36 | 13 | 75 | 256 | 0.69 |
| | 2000 | 30000 | 12 | 0 | 36 | 13 | 75 | 256 | 0.69 |
| | 1000 | 30000 | 12 | 0 | 36 | 13 | 75 | 256 | 0.69 |

| | IV difference (raw material − film) (dl/g) | Number of defects (per 10000 square meters) | Arithmetic mean height (μm) | Static friction coefficient | Dynamic friction coefficient | Surface layer of roll | |
|---|---|---|---|---|---|---|---|
| | | | | | | Thickness difference of maximum concave portion (μm) | Irregularity of thickness of maximum concave portion (%) |
| Example 1 | 0.04 | 0.1 | 0.03 | 0.3 | 0.28 | 0.5 | 4.2 |
| | 0.04 | 0 | 0.03 | 0.31 | 0.29 | 0.4 | 3.3 |
| | 0.04 | 0 | 0.03 | 0.31 | 0.3 | 0.4 | 3.3 |
| Example 2 | 0.04 | 0.1 | 0.05 | 0.22 | 0.2 | 0.6 | 5 |
| | 0.04 | 0 | 0.05 | 0.21 | 0.2 | 0.4 | 0.33 |
| | 0.04 | 0 | 0.05 | 0.22 | 0.2 | 0.4 | 0.33 |
| Example 3 | 0.04 | 0 | 0.03 | 0.32 | 0.3 | 0.4 | 6.7 |
| | 0.04 | 0 | 0.03 | 0.33 | 0.29 | 0.3 | 5 |
| | 0.04 | 0 | 0.03 | 0.33 | 0.29 | 0.3 | 5 |
| Comparative Example 1 | 0.04 | 0.1 | 0.03 | 0.33 | 0.29 | 0.6 | 5 |
| | 0.04 | 0 | 0.03 | 0.32 | 0.3 | 0.5 | 4.2 |
| | 0.04 | 0 | 0.03 | 0.32 | 0.3 | 0.4 | 3.3 |
| Comparative Example 2 | 0.04 | 0 | 0.03 | 0.31 | 0.29 | 1.2 | 10 |
| | 0.04 | 0 | 0.03 | 0.3 | 0.3 | 1.2 | 10 |
| | 0.04 | 0 | 0.03 | 0.31 | 0.29 | 1.2 | 10 |

TABLE 4

| | Maximum value of sample every 1000 m from surface layer of film roll to winding core | | Refractive index difference in width direction of maximum concave portion | Irregularity of thickness in entire width direction of film roll (%) | Winding hardness of roll | | |
|---|---|---|---|---|---|---|---|
| | Thickness difference of maximum concave portion (μm) | Irregularity of thickness of maximum concave portion (%) | | | Winding hardness of surface layer of roll | Difference between maximum value and minimum value of winding hardness in width | Variation in winding hardness in width direction (%) |
| Example 1 | 0.8 | 6.7 | 0.0078 | 8 | 580 | 95 | 16.4 |
| | 0.7 | 5.8 | 0.007 | 7.5 | 593 | 88 | 14.8 |
| | 0.7 | 5.8 | 0.0068 | 7 | 602 | 78 | 13.0 |
| Example 2 | 0.9 | 7.5 | 0.008 | 8.5 | 588 | 95 | 16.2 |
| | 0.8 | 6.7 | 0.0075 | 8 | 599 | 90 | 15.0 |
| | 0.7 | 5.8 | 0.0072 | 7.2 | 610 | 74 | 12.1 |
| Example 3 | 0.5 | 8.3 | 0.009 | 9.5 | 655 | 95 | 14.5 |
| | 0.5 | 8.3 | 0.009 | 9 | 665 | 95 | 14.3 |
| | 0.5 | 8.3 | 0.0088 | 9 | 670 | 88 | 13.1 |
| Comparative Example 1 | 0.8 | 6.7 | 0.0079 | 8 | 476 | 66 | 13.9 |
| | 0.8 | 6.7 | 0.0072 | 8 | 480 | 62 | 12.9 |
| | 0.7 | 5.8 | 0.0058 | 7.5 | 490 | 55 | 11.2 |
| Comparative Example 2 | 1.5 | 12.5 | 0.0114 | 14 | 608 | 168 | 27.6 |
| | 1.5 | 12.5 | 0.0113 | 14 | 622 | 160 | 25.7 |
| | 1.4 | 11.7 | 0.011 | 13 | 635 | 145 | 22.8 |

| | Immediately after production | | After storage for one year | | |
|---|---|---|---|---|---|
| | Presence or absence of sagging | Wrinkles on surface layer of film roll | Presence or absence of sagging | Wrinkles on surface layer of film roll | Number of printing omissions (per 10000 square meters) |
| Example 1 | Good | Good | Good | Good | C |
| | Good | Good | Good | Good | 4 |
| | Good | Good | Good | Good | 5 |
| Example 2 | Good | Good | Good | Good | 4 |
| | Good | Good | Good | Good | 3 |
| | Good | Good | Good | Good | 4 |
| Example 3 | Good | Good | Good | Good | 2 |
| | Good | Good | Good | Good | 4 |
| | Good | Good | Good | Good | 3 |

TABLE 4-continued

| | | | | | |
|---|---|---|---|---|---|
| Comparative | Good | Good | Poor | Poor | 36 |
| Example 1 | Good | Good | Poor | Poor | 45 |
| | Good | Good | Poor | Poor | 33 |
| Comparative | Poor | Average | Poor | Poor | 29 |
| Example 2 | Poor | Average | Poor | Poor | 33 |
| | Poor | Average | Poor | Poor | 31 |

INDUSTRIAL APPLICABILITY

The biaxially-oriented polyester film roll of the present invention is satisfactory in terms of sagging as described above, and thus can be used suitably in processing such as printing.

The invention claimed is:

1. A biaxially oriented polyester film roll formed by winding the biaxially oriented polyester film around a film roll, the biaxially oriented polyester film roll comprising:
   an antimony content in the biaxially oriented polyester film is 10 ppm or less;
   a phosphorus content in the biaxially oriented polyester film is 25 ppm or more and 75 ppm or less;
   an arithmetic mean roughness of the surface of the biaxially oriented polyester film is 0.02 μm or more and 0.05 μm or less; and
   the biaxially oriented polyester film roll satisfying the following requirements (1) to (6):
   (1) a winding length of the film roll is 8000 m or more and 80000 m or less;
   (2) a width of the film roll is 500 mm or more and 4000 mm or less;
   (3) an average hardness is in the range of 500 or more and 700 or less when a hardness of an outermost surface layer of the polyester film roll is measured at an interval of 50 mm along the film width direction;
   (4) a variation in hardness is 10% or more and 20% or less when a hardness of an outermost surface layer of the polyester film roll is measured at an interval of 50 mm along the film width direction;
   (5) a thickness of a polyester film of the polyester film roll is 5 μm or more and 40 μm or less; and
   (6) an irregularity of thickness in the maximum concave portion, which is obtained from the maximum thickness difference in the maximum concave portion and an average film thickness, is 10% or less at a position where a thickness pattern makes a concave portion in an irregularity of thickness in the width direction on a surface layer of the film roll and at a concave portion that has a maximum thickness difference (maximum concave portion).

2. The biaxially oriented polyester film roll according to claim 1, wherein an irregularities of thicknesses of all of samples, which are obtained from their maximum thickness differences in their maximum concave portions and the film average thicknesses, are 10% or less in the irregularities of thicknesses in the film width direction of samples, which are obtained by sampling from the surface layer of the film roll of the biaxially-oriented polyester film at an interval of 1000 m along a winding length.

3. The biaxially oriented polyester film roll according to claim 1, wherein an absolute value of a difference between refractive indices in the width direction at the maximum thickness position of either of the both ends of the concave portion and at the minimum thickness position of the concave portion is 0.010 or less in the maximum concave portion in the thickness pattern along the width direction of the polyester film roll.

4. The biaxially oriented polyester film roll according to claim 1, wherein a number of defects with a size of 1 mm or more is 1.0 or less per 10000 square meters of the film.

5. The biaxially oriented polyester film roll according to claim 1, wherein both of a static friction coefficient and a dynamic friction coefficient between the film surfaces of the winding outside and the winding inside of the biaxially-oriented polyester film are 0.1 or more and 0.8 or less.

6. The biaxially oriented polyester film roll according to claim 1, wherein an intrinsic viscosity of the film is 0.51 dl/g or more and 0.70 dl/g or less.

7. A method for producing the biaxially-oriented polyester film roll according to claim 1, wherein the method comprises the steps of:
   melt-extruding a raw material polyester resin such that a difference between an intrinsic viscosity of the raw material polyester resin and an intrinsic viscosity of the polyester film is 0.06 dl/g or less,
   cooling and solidifying the thus obtained extruded resin film to obtain an unstretched film,
   biaxial stretching the unstretched film,
   heat setting the thus obtained biaxial stretched film,
   winding the biaxially-oriented film as a master roll,
   slitting the master roll, and
   winding the thus obtained film into a roll.

8. The biaxially oriented polyester film roll according to claim 2, wherein an absolute value of a difference between refractive indices in the width direction at the maximum thickness position of either of the both ends of the concave portion and at the minimum thickness position of the concave portion is 0.010 or less in the maximum concave portion in the thickness pattern along the width direction of the polyester film roll.

9. The biaxially oriented polyester film roll according to claim 8, wherein a number of defects with a size of 1 mm or more is 1.0 or less per 10000 square meters of the film.

10. The biaxially oriented polyester film roll according to claim 9, wherein both of a static friction coefficient and a dynamic friction coefficient between the film surfaces of the winding outside and the winding inside of the biaxially-oriented polyester film are 0.1 or more and 0.8 or less.

11. The biaxially oriented polyester film roll according to claim 10, wherein an intrinsic viscosity of the film is 0.51 dl/g or more and 0.70 dl/g or less.

12. The biaxially oriented polyester film roll according to claim 1, wherein the biaxially oriented polyester film roll further comprises aluminum, and the aluminum content in the biaxially oriented polyester film is 1 to 80 ppm.

* * * * *